Nov. 5, 1957 C. E. SCHRADER 2,812,081
TRACTOR MOVER
Filed Oct. 15, 1953 2 Sheets-Sheet 1

Chester E. Schrader
INVENTOR.,
BY
Attorneys

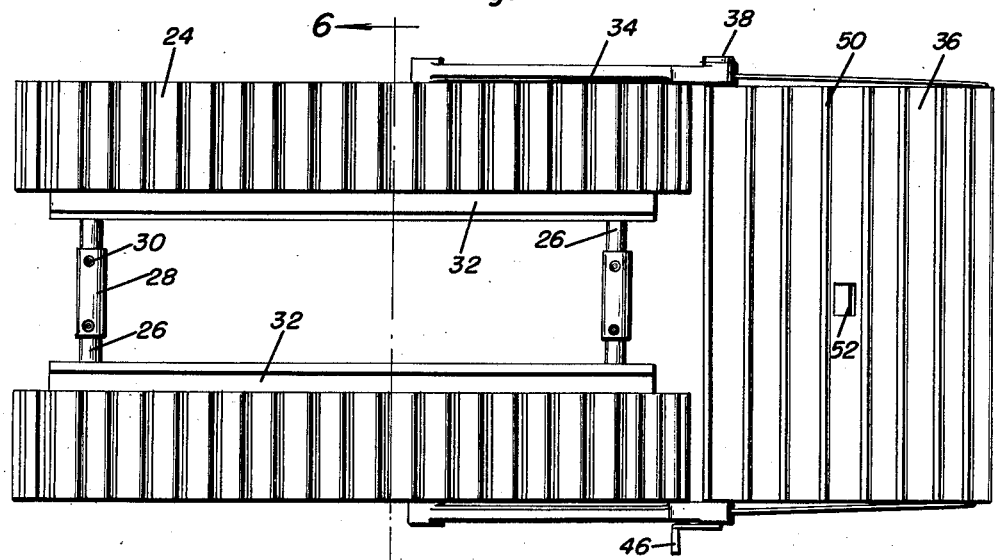
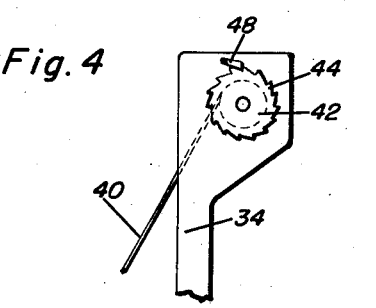
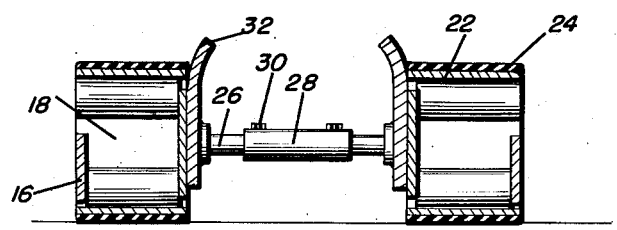

United States Patent Office 2,812,081
Patented Nov. 5, 1957

2,812,081

TRACTOR MOVER

Chester E. Schrader, Lombard, Ill.

Application October 15, 1953, Serial No. 386,360

1 Claim. (Cl. 214—85)

This invention relates to a tractor mover, and more specifically provides a device for transporting a tractor without the use of an auxiliary trailer and truck.

An object of this invention is to provide a tractor mover wherein the tractor furnishes the power for propelling the tractor and mover over the surface.

Another object of this invention is to provide a tractor mover having padded tracks for movement over highway surfaces, thereby eliminating the cutting of such surfaces when a cleated tractor passes thereover.

A further object of this invention is to provide a tractor mover which eliminates the use of a tractor and trailer conveying means.

Yet another object of this invention is to provide a tractor mover which is entirely dependent upon the transported tractor for its driving and steering means.

A still further object of this invention is to provide a tractor mover which is rugged in construction, easy to operate, economical in operation, and relatively inexpensive to manufacture.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 3 is a top plan view of the tractor mover of this invention;

Figure 4 is a detail side view showing the ratchet means for the ramp lifting winch;

Figure 5 is a fragmentary, vertical section showing the attachment of the tractor drawbar to the ramp aperture; and Figure 6 is a transverse, vertical section taken substantially along section line 6—6 of Figure 3 showing details of the driving tracks and the axle therefor.

Figure 1:
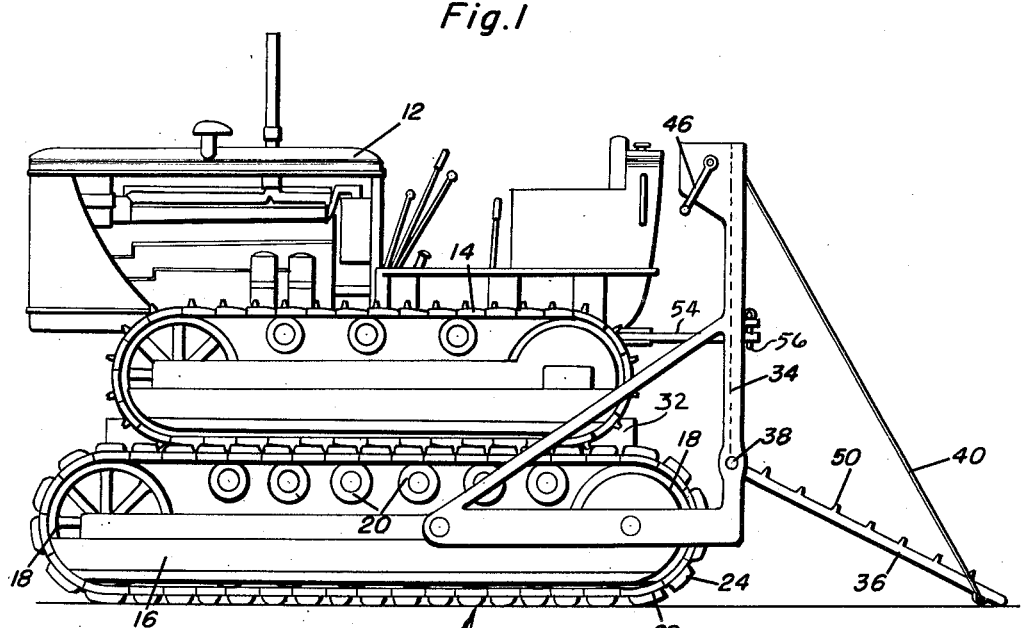
Figure 1 is a side elevation view showing the tractor mover of this invention with a tractor mounted thereupon.
Figure 2:
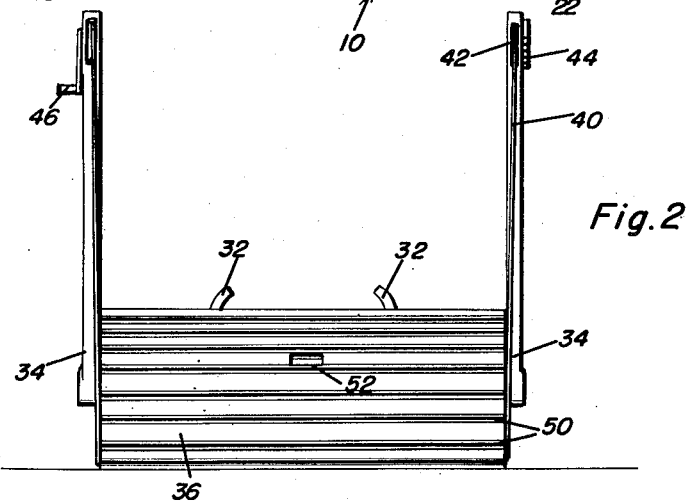
Figure 2 is an end elevation of the tractor mover of this invention with the tractor removed.

Referring now specifically to Figure 1, it will be seen that the numeral 10 generally designates the tractor mover of this invention having a tractor 12 mounted thereupon. It will be noted that this specific embodiment is especially designed for a tractor having endless cleated tracks 14 thereon which are usually known as "cats."

Referring now more specifically to the drawings in detail, it will be seen that the tractor mover 10 has a frame member 16 supporting a pair of end rollers 18 and a plurality of idler rollers 20 for guiding the movement of an endless track 22 having rubber padded blocks 24 thereon for engaging the ground surface. A pair of axle members 26 connect the frame member 16 and the tracks or treads 22 together adjacent the front and rear rollers 18, and the rollers 18 are rotatably journaled on the axles 26 by any suitable bearing means. The axles 26 are adjustable in length by the use of a tubular member 28, telescopically engaging the inner ends of the axles 26 and having setscrews 30 for adjusting the length of the axles 26 in an obvious manner. Connected to the frame 16 and extending upwardly therefrom along the inner edge of the tracks 22 are inwardly flanged guide rails 32 for guiding the treads 14 of the tractor 12 upon the treads 22. A pair of brackets 34 are secured to the frame member 16 and are provided with an upstanding portion. The ramp 36 is pivoted between the upstanding portion of the brackets 34 by a suitable pivot axis 38, and a lifting cable 40 is attached to the outer end of the ramp 36 for raising and lowering the ramp. A winch 42 having ratchet teeth 44 adjacent its periphery is secured to the uppermost portion of the brackets 34 and the cable 40 is passed over the winch 42 and the winch 42 is rotated by suitable handles 46 and maintained in adjusted position by the gravity-operated pawl 48 which permits rotation of the winch in only one direction until the pawl 48 is disengaged from the teeth 44. The upper surface of the ramp 36 is provided with a plurality of horizontally elongated lugs 50, thereby providing traction for the tractor 12. It will be noted that the pivot axis 38 and the uppermost portion of the ramp 36 is substantially coplanar with the upper surface of the treads 22, thereby providing a ramp for the tractor 12 to be placed upon the tractor mover 10. An aperture 52 is located adjacent the center of the ramp 36 and the tractor drawbar 54 is positioned in the aperture 52 when the ramp 36 is raised. A pin 56 is inserted through apertures in the drawbar 54 at the remote end thereof, thereby maintaining the drawbar 54 in attached relation to the ramp 36. As best seen in Figure 5, the cable 40 is secured to the ramp 36 by a plurality of integral eye members 58 extending across the under-surface of the ramp 36.

The operation of the device will be readily understood. With the ramp member 36 in its lowered position substantially as shown in Figure 1, the tractor 12 is driven up the ramp 36 onto the upper surface of the treads 22 and the "cat's" cleats are in engagement with the rubber pads 24, with the cleats being positioned between adjacent pads 24. The ramp 36 is then raised by operating the handle 46 and the winch 42, thereby winding the cable up and pivoting the ramp 36 about its pivot axis 38. The pin 56 is removed from the drawbar 54 so that the drawbar may pass through the aperture 52 in the ramp 36 and the pin 56 is inserted on the opposite side of the ramp 36, thereby locking the tractor drawbar 54 to the bracket 34 and the frame 16. The tractor operator then operates the tractor 12, thereby turning the "cats" 14, which in turn rotate the endless treads 22 by engaging the rubber pads 24. The specific embodiment is shown so that the "cats" are operated in reverse, thereby giving the tractor mover a forward motion, wherein the tractor operator may easily observe the course of his travel. The tractor mover 10 is guided in the same manner as the tractor 12 with the operator selectively applying the brakes to the "cats" 14 as required. Obviously, the tractor mover 10 has no motive power of its own nor does it have any steering power of its own, thereby providing an inexpensive and very rugged structure. The inwardly directed guide member 32 positively guides the "cats" 14 into position on the treads 22 and the adjustment means 28 is provided so the treads 22 may be adjusted laterally of each other for accommodating different sizes of tractors. This tractor mover eliminates the use of the usual trailer and truck for transporting the tractor from job to job, thereby eliminating extra cost and overhead. The rubber pads 24 permit the tractor mover 10 to be moved over any paved surface without impairing the surface. The device of this invention may be employed without necessitating the tying up of a truck and a trailer for moving the tractor, thereby permitting the construction workers to efficiently and quickly transport their heavy truck-moving equipment from one position to the other without the use of a truck and a truck driver. Obviously, the frame and roller structure are constructed of a suitable material meeting the various requirements of the device.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

Having described the invention, what is claimed as new is as follows:

A tractor mover comprising a supporting frame having a front end and side members, endless ground engaging tracks on said side members supporting the same and adapted to support thereon endless treads of a tractor for driving of said tracks by said treads, upright frames on said side members at the front end of the frame, a ramp for loading a tractor onto said tracks, said ramp pivotally secured to said frame at such an elevation as to permit a tractor to pass from said ramp to said tracks, winch means having a flexible cable attached thereto secured to said frame for raising said ramp into a substantially upright position, guide rails adjacent to and extending above said tracks and secured to said frame for guiding the treads of a tractor onto said tracks, means for locking a tractor to said ramp against movement of the drive of said tracks by said treads comprising a drawbar attachable to a tractor, said ramp having a central opening receiving said drawbar when the ramp is raised, and pin secured means insertible through said drawbar in front of said ramp to prevent the drawbar from moving out of said opening, and front and rear extensible transverse connections between said side members to vary the spacing of the said tracks for tractors of different widths.

References Cited in the file of this patent

UNITED STATES PATENTS

| | | |
|---|---|---|
| 1,261,681 | Barnett | Apr. 2, 1918 |
| 1,880,126 | Fageol | Sept. 27, 1932 |
| 2,037,983 | Johnston | Apr. 21, 1936 |
| 2,118,961 | Alden | May 31, 1938 |
| 2,309,198 | McCleneghan | Jan. 26, 1943 |
| 2,681,231 | Kondracki | June 15, 1954 |

FOREIGN PATENTS

| | | |
|---|---|---|
| 571,803 | France | Feb. 8, 1924 |